Feb. 14, 1933.   C. A. GRASSWICK   1,897,611
COMBINE HARVESTER FOR CUTTING AND THRESHING GRAIN
Filed March 16, 1931   4 Sheets-Sheet 2

Inventor:
C. A. Grasswick
By Whiteley and Ruckman
Attorneys.

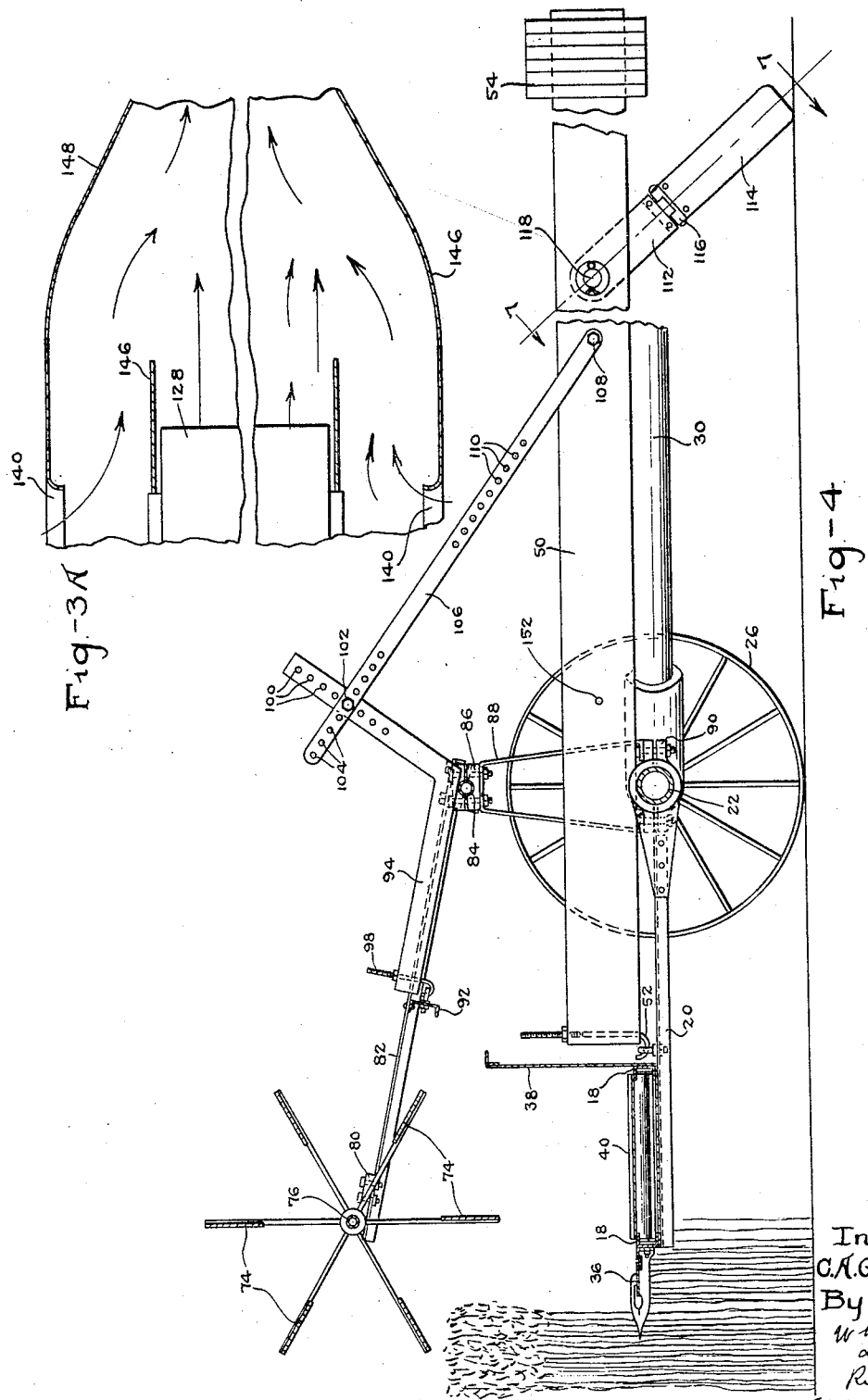

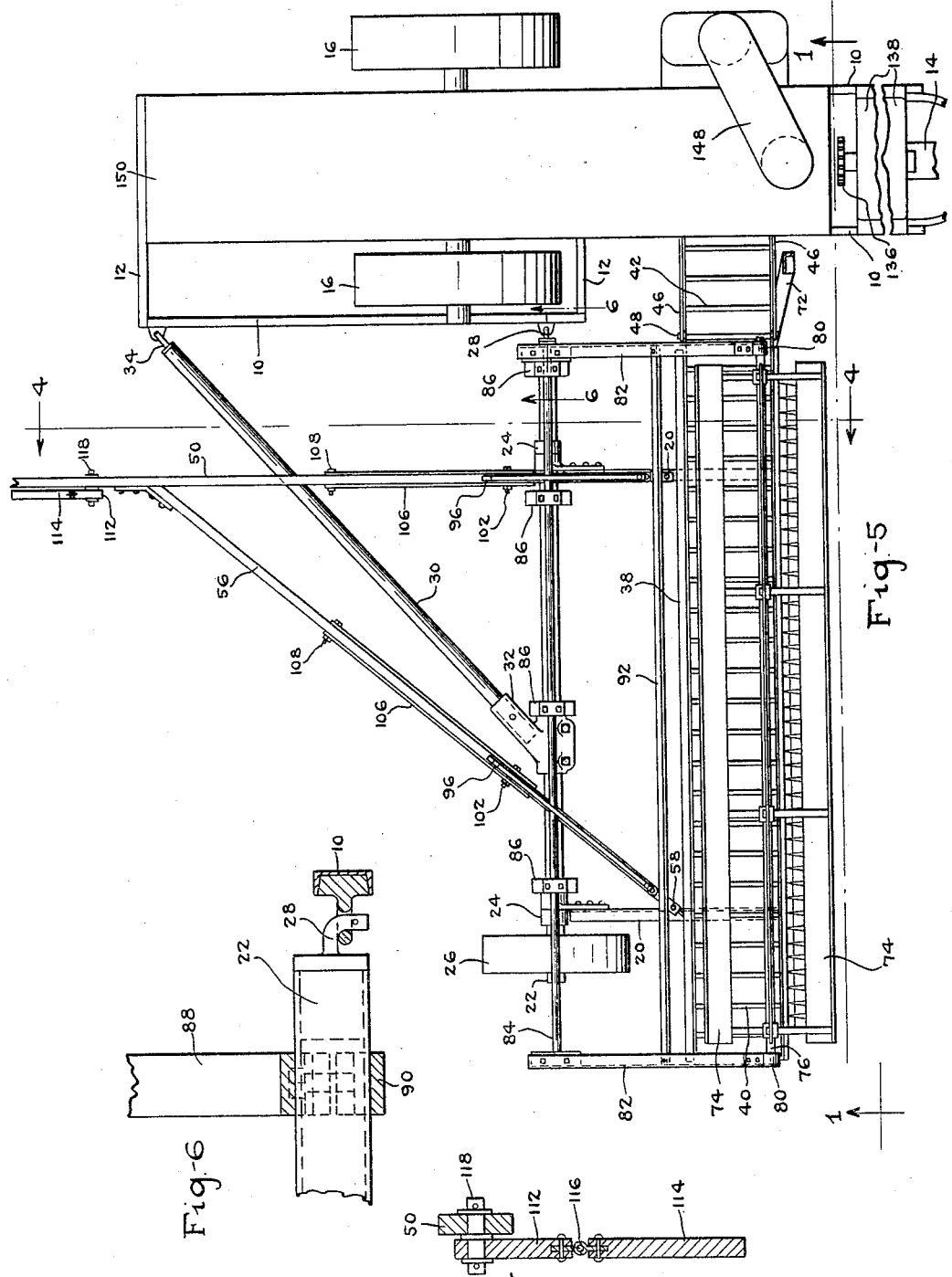

Patented Feb. 14, 1933

1,897,611

UNITED STATES PATENT OFFICE

CARL A. GRASSWICK, OF VALLEY CITY, NORTH DAKOTA

COMBINE-HARVESTER FOR CUTTING AND THRESHING GRAIN

Application filed March 16, 1931. Serial No. 522,845.

My invention relates to combine-harvesters for cutting and threshing grain in which there is a main frame for supporting the threshing mechanism and a supplementary frame flexibly attached to one side of the main frame, the supplementary frame supporting a header platform provided at its front with cutting mechanism extending transversely and laterally disposed with relation to the main frame. Among the objects of the invention comprising the combination are the provision of means for feeding the cut grain in a straight line from the header platform to a threshing cylinder and concave mounted on the main frame; the provision of housed fans at the two ends of the cylinder which suck the threshed material from the cylinder into the inlet opening of a tubular conveyor along which this material is then forced by the blast of air produced by the fans; the provision of a reel which is automatically raised and lowered as the forward end of the header platform is raised and lowered and to a greater extent than such raising and lowering of the header platform; and the provision of a stabilizer which will prevent rocking movement of the header platform and cutting mechanism particularly when the platform is tilted downwardly for cutting short grain and when the machine is passing over rough ground.

The full objects and advantages of my invention will appear in connection with the detailed description thereof, and the novel features of my inventive idea will be particularly pointed out in the claims.

In the accompanying drawings which illustrate a practical embodiment of my invention,—

Figure 1:
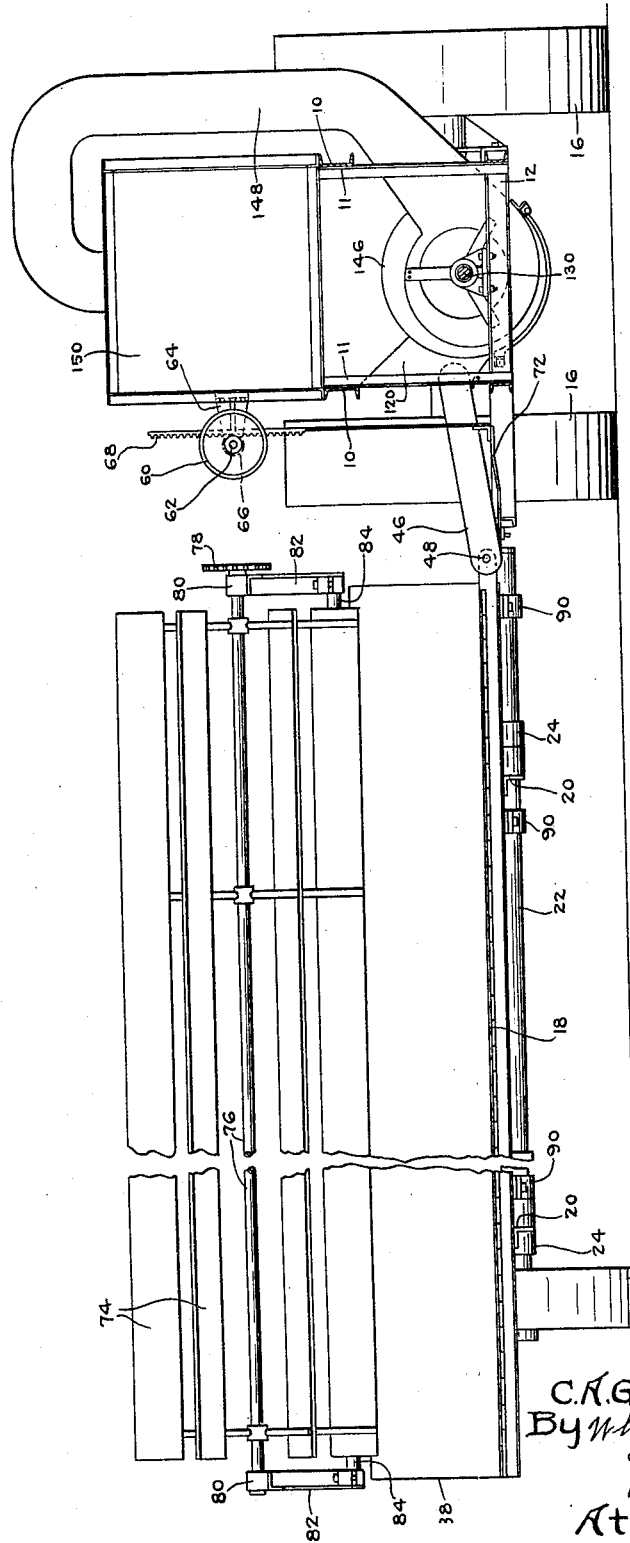
Figure 2:
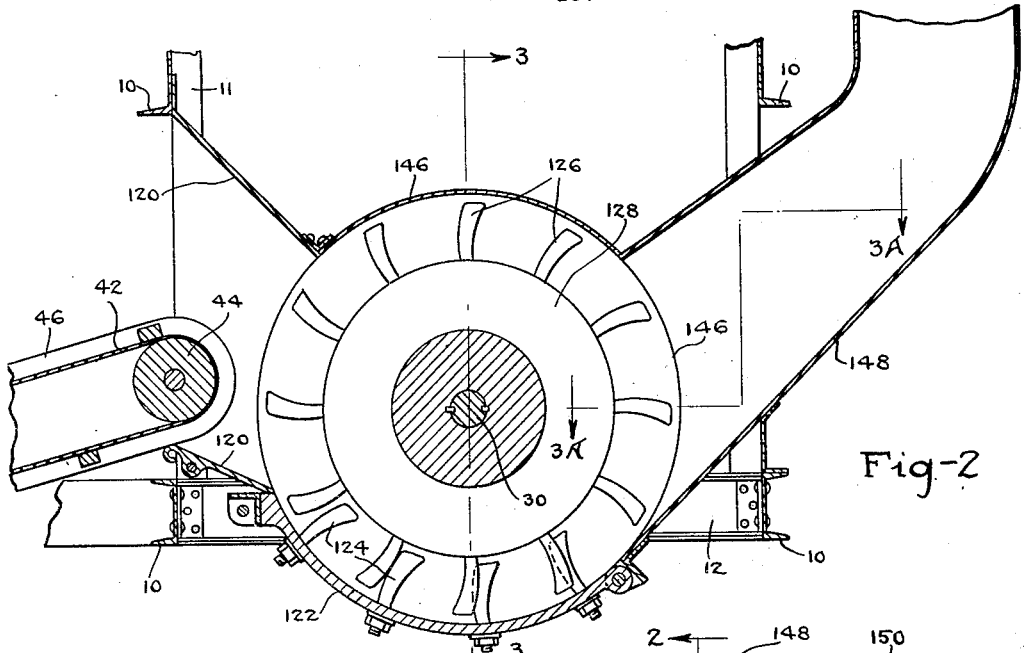
Figure 3:
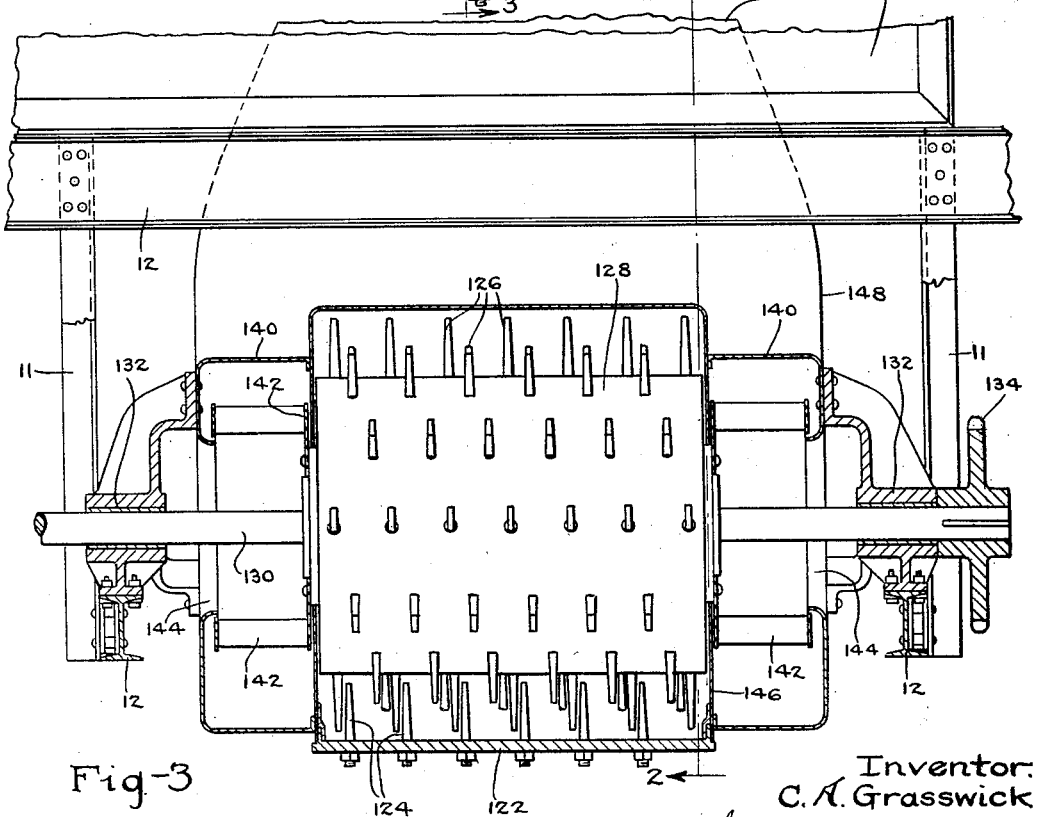

Fig. 1 is a front elevational view of the machine with a small portion in section as indicated by the line 1—1 of Fig. 5. Fig. 2 is a view in section on the line 2—2 of Fig. 3. Fig. 3 is a view in section on the line 3—3 of Fig. 2. Fig. 3A is a view in section on the line 3A—3A of Fig. 2. Fig. 4 is a view in section on the line 4—4 of Fig. 5. Fig. 5 is a top plan view with a small portion in section. Fig. 6 is a view in section on the line 6—6 of Fig. 5. Fig. 7 is a view in section on the line 7—7 of Fig. 4.

Referring to the construction illustrated in the drawings, the numeral 10 designates longitudinal members, the numeral 11 designates vertical members and the numeral 12 designates transverse members of a main frame which is supported by a front wheel 14 and a pair of rear wheels 16. It will be understood that the machine may be pulled over the ground by hitching a tractor to the front frame. A header platform 18 is detachably secured to the side of the main frame. This platform is carried by the forward portions of longitudinal bars 20 whose rear ends are pivotally mounted on a fixed axle 22 and kept from shifting laterally by collars 24 secured to the axle. The outer end of this axle carries a ground wheel 26 while the inner end thereof is attached to a longitudinal frame member 10 by a hook 28 as best shown in Fig. 6. An inclined brace 30 as best shown in Fig. 5 is secured at its forward end to an intermediate portion of the axle 22 by an attaching member 32 as shown in Fig. 5 while the rear end of the brace is attached to the frame member 10 by a hook 34. It will therefore be understood that the header platform 18 is carried by a supplementary frame which is flexibly and detachably connected to the main frame. The header platform at its front is provided with the usual sickle 36 operated in the customary manner and at its rear is provided with a backboard 38. The platform is provided with an endless belt conveyor or apron 40, the inner portion 42 thereof being somewhat inclined upwardly and trained around a roller 44 as shown in Fig. 2, this roller being carried by the free ends of side pieces 46 pivoted at 48 as shown in Fig. 1. A balance beam 50 is attached at its forward end to one of the platform members 20 by a hook and eye connection 52 as will be understood from Fig. 4. The rear end of the beam 50 carries a number of adjustable counterweights 54. The rear end of an inclined brace bar 56 is secured to the rearward portion of the beam 50, the front end of this brace bar having a hook connection 58 with one of the platform members 20. The header platform may be tilted up and down around the axle 22 as an axis of rotation by suitable means such as a hand wheel 60 secured to a shaft 62 mounted in a bracket 64 carried by the main portion of the machine. A pinion 66 secured to the shaft 62 meshes with a rack bar 68 having a lower portion 70 which is connected to the platform 18 by a bar 72.

Reel members 74 are carried by a reel shaft 76 driven in customary manner by a sprocket gear 78 secured to one end thereof. The shaft 76 is mounted in bearings 80 carried by the forward ends of arms 82 whose rear ends are rotatably supported on a transverse rod 84. The rod 84 is secured in clamping members 86 carried by the upper ends of standards 88 which as will be understood from Figs. 4 and 5 extend up from clamping members 90 secured to the axle 22. The arms 82 are connected by a transverse bar 92 as will be understood from Figs. 4 and 5. A pair of angle irons having arms 94 and 96 are intermediately and rotatably mounted on the rod 84. The ends of the arms 94 are secured by hooked bolts 98 to the transverse bar 92. The arms 96 are provided with a series of holes 100. Bolts 102 are adapted to pass through any one of these holes and through any one of a series of holes 104 formed in the upper portions of bars 106 whose lower ends are pivoted by pivot bolts 108 to the beam 50 and to the bar 56 respectively. The intermediate portions of the bars 106 are provided with a series of holes 110 for a purpose which will presently appear. The rear portion of the beam 50 is provided with a depending stabilizer which consists of two members 112 and 114 which are joined by a hinge 116 which permits lateral movement of the member 114 with relation to the member 112. The upper end of the member 112 is pivoted to the beam 50 by a transverse pivot pin 118.

Referring now to Figs. 2 and 3, it will be seen that the side members 48 between which the conveyor 42 runs, rest upon the lower portion of a throat member 120 secured to the main frame of the machine. Extending from the lower portion of the throat 120 is a concave 122 provided with teeth 124 which cooperate with teeth 126 carried by a cylinder 128 secured to a shaft 130 mounted in bearings 132 carried by the frame. The front end of the shaft 130 carries a sprocket wheel 134 adapted to be driven from a sprocket wheel 136 secured to the shaft of a motor 138 mounted at the front of the frame and adapted to drive the operating parts of the machine in well known manner. At the two ends of the cylinder 128, there are casing members 140 within which are fans 142 secured to the shaft 130 and which draw air in through openings 144. Leading from the casing members 140 and from the enclosure 146 which is around the cylinder, there is a tubular member 148 which extends upwardly as shown in Fig. 1 and is then turned downwardly so as to enter a separator box 150 containing separator elements of well known or any suitable construction and which do not need to be described herein.

The operation and advantages of my invention will be obvious in connection with the foregoing description. The severed heads of grain are swept by the reel onto the conveyor traveling upon the header platform and these heads are delivered through the throat 120 to the cylinder and concave so as to be subjected to the threshing action thereof. By referring to Fig. 3A, it will be understood that the grain and straw are sucked from the cylinder and concave by the action of the two fans and that when this material passes into the tubular member or conveyor 148, the blast of air carries it along for delivery to the separator box 150. It will be understood from Fig. 4 that when the header platform is lowered, the reel will be automatically lowered and to a greater extent, and when the platform is raised, the reel will be automatically raised and to a greater extent. This is due to the fact that the lever connections between the beam 50 and the reel are such as to give an increased movement to the latter. The provision of the series of holes 100 and 104 permits the increased movement of the reel to be varied. With the device set as shown and assuming the front of the header platform to be lifted one foot from the ground, the reel will be raised about two feet. The reason for providing this movement of the reel is obvious. When the platform is tilted down, so as to cut short grain, the reel should be close to the sickle so as to sweep the short severed heads backward. However, when the platform is tilted upwardly to cut tall grain, the reel will operate to much better advantage by having it spaced a much greater distance above the sickle. In case it should be found desirable to have the platform and reel move up and down at the same rate, then the bars 106 are moved from the position shown and then one of the holes 110 is made to register with one of the holes 100 while one of the holes 104 is made to register with holes 152 in the beam 50 and bar 56, the bars 106 then being secured by bolts passing through the registered holes. It will be understood that the header platform is counterbalanced by the weights 54 and that when the machine is passing over rough ground, a certain amount of rocking or swinging movement will be imparted to the platform. When short grain is being cut, the length of straw cut off is also short and swinging movement of the platform causes some of the heads to be missed. In order to prevent this, the stabilizer consisting of the members 112 and 114 is provided. When the platform is tilted downwardly, the stabilizer will assume a vertical or more nearly vertical position with the result that rocking movement of the platform is prevented. When the platform is again tilted upwardly, the dragging of the lower end of the stabilizer on the ground causes the stabilizer to swing back into its rearwardly inclined position. In order that corners may be turned without damage to the stabilizer, it is provided with the laterally operating hinge 116.

I claim:

1. In a combine-harvester, the combination of a main frame, a supplementary frame flexibly attached to one side of said main frame, a cylinder and concave carried by said main frame, a header platform and cutting mechanism tiltably carried by said supplementary frame, a depending stabilizer pivotally attached to the rear of said supplementary frame, and a conveyor for carrying the cut grain from said platform to said cylinder.

2. In a combine-harvester, the combination of a main frame, a supplementary frame flexibly attached to one side of said main frame, a cylinder and concave carried by said main frame, a header platform and cutting mechanism tiltably carried by said supplementary frame, a depending stabilizer pivotally attached to the rear of said supplementary frame, said stabilizer consisting of two members connected together by a laterally operating hinge, and a conveyor for carrying the cut grain from said platform to said cylinder.

3. In a combine-harvester, the combination of a main frame, a supplementary frame flexibly attached to one side of said main frame, a cylinder and concave carried by said main frame, a header platform and cutting mechanism tiltably carried by said supplementary frame, a support rockably carried by said supplementary frame, a reel mounted on said support, a rigid connection between said support and said supplementary frame whereby said reel is caused to automatically raise and lower with said platform and to a greater extent than the latter, and a conveyor for carrying the cut grain from said platform to said cylinder.

4. In a combine-harvester, the combination of main frame, a supplementary frame flexibly attached to one side of said main frame, a cylinder and concave carried by said main frame, a header platform and cutting mechanism tiltably carried by said supplementary frame, standards extending up from said supplementary frame, a support rockably carried by said standards, a reel mounted on the forward portion of said support, an arm carried by the rear portion of said support, a bar for connecting said arm with the rear portion of said supplementary frame whereby said reel is caused to automatically raise and lower with said platform and to a greater extent than the latter, and a conveyor for carrying the cut grain from said platform to said cylinder.

5. In a combine-harvester, the combination of a main frame, a supplementary frame flexibly attached to one side of said main frame, a cylinder and concave carried by said main frame, a header platform and cutting mechanism tiltably carried by said supplementary frame, standards extending up from said supplementary frame, a support rockably carried by said standards, a reel mounted on the forward portion of said support, an arm carried by the rear portion of said support, a bar for connecting said arm with the rear portion of said supplementary frame whereby said reel is caused to automatically raise and lower with said platform and to a greater extent than the latter, said bar being adapted to have its connection with said supplementary frame changed to a more forward position whereby said platform and reel will be automatically caused to raise and lower to the same extent, and a conveyor for carrying the cut grain from said platform to said cylinder.

6. In a combine-harvester, the combination of a main frame, a supplementary frame flexibly attached to one side of said main frame, a header platform and cutting mechanism tiltably carried by said supplementary frame, and a stabilizer associated with said header platform for overcoming swinging movement thereof.

7. In a combine-harvester, the combination of a main frame, a supplementary frame flexibly attached to one side of said main frame, a cylinder and concave carried by said main frame, a header platform and cutting mechanism tiltably carried by said supplementary frame, a stabilizer associated with said header platform for overcoming swinging movement thereof, and means for carrying cut grain from said platform to said cylinder.

In testimony whereof I hereunto affix my signature.

CARL A. GRASSWICK.